United States Patent Office 3,457,051
Patented July 22, 1969

3,457,051
METALLIC REFRACTORY COMPOSITIONS
Horacio E. Bergna, Wilmington, Del., assignor to E. I. du Pont de Nemours and Company, Wilmington, Del., a corporation of Delaware
No Drawing. Continuation-in-part of application Ser. No. 423,314, Jan. 4, 1965. This application Oct. 1, 1965, Ser. No. 492,257
Int. Cl. B22f 3/00, 5/00
U.S. Cl. 29—182.5
11 Claims

ABSTRACT OF THE DISCLOSURE

Compositions are disclosed which are made from (1) a metal (Mo, W, or their alloys), (2) alumina, (3) a boride of Ti, Al, Ta, Zr, W, Mo, Hf, or mixtures thereof, and (4) optionally a wetting agent, such as titanium hydride. The compositions are useful as high temperature refractories and for making cutting tools.

Related cases

This application is a continuation-in-part of copending application Ser. No. 423,314, filed Jan. 4, 1965, now abandoned.

Description of the invention

This invention relates to refractory compositions and is more particularly directed to molybdenum or tungsten and their alloys in which is dispersed alumina and a metalline compound selected from among the borides of titanium, aluminum, zirconium, tantalum, hafnium, molybdenum and tungsten. This invention is further directed to the preparation of these dispersions and to their use as high temperature refractories and cutting tools.

The refractory dispersions of this invention are exceptionally hard and strong, and display outstanding resistance to chemicals, thermal shock, impact, and high temperatures. Accordingly, they can be used in the numerous ways in which refractory materials are conventionally used. Further, in the form of tool bits and cutting tools, these dispersions display great resistance to wear, great resistance to cratering, and are resistant to welding to work pieces being cut even at high speeds.

According to the present invention, I have discovered that a homogeneous dispersion of alpha alumina and a metalline, in the form of fine particles, in molybdenum, tungsten or their alloys in a manner such that the alpha alumina, the metalline and the metal are interdispersed or mutually dispersed in relation to one another, provides a refractory dispersion possessing the exceptional properties discussed herein.

The metals suitable for use in the dispersions of this invention are molybdenum or tungsten or their alloys with minor amounts of conventional alloying agents which are more fully explained hereinafter.

Molybdenum or tungsten with the requisite degree of purity and subdivision can be obtained from commercial sources or they can be prepared in a conventional manner. A suitable method of preparation and purification is fully set forth hereinafter.

The alpha alumina to be used in the dispersions of this invention can be prepared in any conventional manner such as by extended ballmilling of fine commercial alumina powder followed by purification and separation of the coarser fractions. Preparation of alpha alumina is fully described in copending application Ser. No. 298,580, filed July 30, 1963 now U.S. Patent 3,370,017, and is more fully described hereinafter.

The metalline compounds suitable for use in the dispersions of this invention are such refractory compounds as the borides of titanium, aluminum, zirconium, tantalum, hafnium, molybdenum or tungsten. They can be prepared by extended milling of the fine commercial powders of such metalline compounds, as is more fully exemplified hereinafter.

Optionally, the dispersions of this invention can contain a minor amount of what I will call a wetting agent selected from among titanium, zirconium, tantalum, hafnium and their hydrides. These metals or their hydrides are used in a finely divided form and can be obtained commercially or can be prepared as is more fully described hereinafter.

The dispersions of this invention are prepared by intimately intermixing the alpha alumina in the form of a colloidal powder with the metalline compound in the form of very fine particles and with the molybdenum or tungsten also in the form of very fine particles, until a homogeneous dispersion is obtained. This homogeneous powder can then be heated and pressed into the desired form and to the desired degree of density. Methods of preparing the powder dispersions and refractory dispersions are more fully discussed hereinafter.

The preparation of the powder dispersions is very important because the outstanding properties of the refractory dispersions formed therefrom depend to a large degree on the composition of the powder. For example, the homogeneity of the interdispersion of metal, alumina, and metalline, the ultimate particle and crystal size of the alumina, metal and metalline, and the proportional amounts of metalline, metal, and alumina are important in achieving the desired properties in the refractory dispersions of this invention and are largely determined by the powder which is used to form the refractory dispersion.

The particle size of the metal, metalline and alpha alumina being incorporated into the powder dispersions of this invention should be as small as is practical and the preferred maximum particle size is about ten microns. However, as the desired homogeneity of dispersion is much easier to attain as the particle size decreases, it is advantageous for the components to have an average particle size of less than one micron.

If the interdispersed powders are to be used to form very strong refractories like cutting tools and bits, it is preferred that the average particle size of the alumina be smaller than 500 millimicrons. Such a particle size adds significantly to the degree of strength, toughness and wear resistance obtainable in the refractory dispersions of this invention and necessary for such compositions as cutting tools.

Refractory dispersions of this invention can be formed from powdered interdispersions of alpha alumina, tungsten or molybdenum and the metalline compound wherein there is from about one to about nine parts by volume of alpha alumina per part by volume of molybdenum or tungsten. If the amount of alpha alumina in a powder is below one part by volume per part of molybdenum or tungsten the hardness and wear resistance of a refractory dispersion made therefrom is less than that which is desired. Amounts of alpha alumina in the powders above nine parts by volume per part of tungsten or molybdenum tend to lessen significantly the impact strength of refractories made therefrom.

A preferred amount of alpha alumina in the powder dispersions of this invention is between about one and about 6 parts by volume per part by volume of molybdenum or tungsten. Restricting the amount of alpha alumina to less than about 6 parts by volume increases the probability of continuity of the metal within the refractory dispersion to be formed, and in turn, the probability of outstanding impact resistance, strength, and toughness. Conversely, the presence of at least one part of alpha alumina by volume per part of tungsten or molybdenum in the powder insures a hardness, wear resistance, and chemical resistance in a refractory dispersion made therefrom which makes it very desirable for such refractory uses as cutting tools and bits.

The amount of wetting agents which can be used in the dispersion of this invention ranges from none at all up to one tenth part by volume per part of molybdenum or tungsten. When a wetting agent is used it tends to proved better bonding between the alumina and the metal. However, depending on the various constituents used, in some instances little or no bonding improvement results from the use of a wetting agent and its use is therefore superfluous.

It is always preferred to use the minimum amount of wetting agent which will effectively improve bonding. For this reason a preferred amount of wetting agent, when it is used, will range from .005 to .05 part by volume per part by volume of molybdenum or tungsten.

The amount of metalline compound in the powdered interdispersions of this invention will range from about 0.05 part to about 4 parts by volume per part by volume of molybdenum or tungsten. If the amount of metalline compound is below about 0.05 part by volume per part of tungsten or molybdenum, it is very difficult to obtain the desired degree of hardness and wear resistance in a refractory dispersion made therefrom, possibly due to a lack of graded bonding which is discussed below. Amounts of metalline compound greater than about 4 parts by volume per part by volume of metal tend to make subsequently formed refractory dispersions undesirably brittle. Similarly, amounts of metalline compound in excess of the amount of alumina by volume tend to make subsequently formed refractory dispersions undesirably brittle.

While the effect of the metalline compounds is not completely understood, it is believed that their action may be two-fold. For example, such compounds as titanium boride are believed to act as grain growth retardants for the alumina, thus helping to form refractory dispersions with a very fine uniform structure.

Moreover it is believed that the metalline compounds form very strong bonds with the alumina and also react with the molybdenum or tungsten to give intermediate phases which contribute to a graded bonding of alumina and metal. Thus titanium boride may react to form molybdenum boride giving a graded bond of

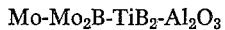
$Mo-Mo_2B-TiB_2-Al_2O_3$ which results in extremely strong, finely grained structures.

One of the preferred embodiments of this invention is a powder dispersion in which the alumina particles are separated from like particles by particles of the metal or metals and metalline compounds. This prevents or decreases agglomeration or aggregation of the alumina particles during fabrication of refractory dispersions of the invention.

Another preferred embodiment of this invention is a dispersion in which discrete particles of alumina are uniformly dispersed in the metal which is present as a continuous phase or matrix separating the discrete alumina praticles and the metalline compound is embedded in the matrix strongly bonded to either or both the alumina and metal. Such an interdispersion ordinarily provides greatly improved mechanical properties in a refractory dispersion, making it much more desirable for uses such as cutting tools and bits.

Still another preferred embodiment of this invention is a refractory dispersion in which particles of alumina and the metalline compound are uniformly dispersed in the metal which is present as a continuous phase or matrix separating the alumina and metalline particles. Such a distribution permits for interaction between the metal and metalline compound at fabrication temperatures creating strong bonds of molybdenum or tungsten intermediate species at the original metal-metalline boundary.

However, it must be noted that a distribution of the components such as described in the three preceding paragraphs is not essential to this invention since outstanding refractories can be produced in the absence of such a state of distribution.

It is desirable that all the components used in the dispersions of this invention possess a high degree of chemical purity. In particular, it is desirable to avoid the presence in any component of oxygen, either in uncombined form or as compounds having a lower free energy of formation per atom than the corresponding borides of titanium, aluminum, zirconium, tantalum, hafnium, molybdenum or tungsten. Other such elements in a form and in amounts which would react with or dissolve in the metal used during fabrication of the refractory dispersion in such a manner so as to cause undesirable brittleness of the metal, should likewise be excluded.

Minor amounts of alloying agents conventionally used with molybdenum or tungsten can be used in the dispersions of this invention so long as they are retained as a homogenous solution with the metal, having the crystal structure of the metal. Amounts of such alloying agents which would form intermetallic compounds or new crystallographic phases should be avoided. Allowable percentages of such agents may be determined, according to this criteria, by consulting appropriate phase diagrams in standard metallurgical texts. For example, small percentages of conventional agents such as iron can be employed.

Similarly small amounts of refractory oxides can be present in the molybdenum or tungsten as a dispersed phase. Such oxides as titania and thoria for example can be present in amounts of up to 10% of the metal without detracting from the desirable properties of the metal phase. Dispersed oxides such as thoria are more fully explained in copending application Ser. No. 169,136 filed Jan. 26, 1962, now Patent No. 3,162,605.

Preparation of the metals

Molybdenum or tungsten suitable for use in this invention can be prepared by conventional methods such as by low temperature hydrogen reduction of the corresponding metal oxide.

Since molybdenum trioxide and tungsten trioxide are somewhat volatile at higher temperatures, it is best to employ a two-stage reduction. The trioxide is first reduced to the lower valent dioxide at a temperature below the melting point of the oxide, such as 600° C. The reduction is then completed at a more elevated temperature such as 900° C. which is low enough to avoid excessive sintering of the tungsten or molybdenum powder.

Reduction will ordinarily be followed by milling operations in an inert liquid medium. Ballmilling times of from 24 to 240 hours have been found satisfactory. The powder can then if desired be purified with an acid such as hydrochloric acid. In this manner the pure metal can be obtained in a powder form of a preferred size which makes it convenient for its subsequent interdispersion with the alpha alumina. It is desirable that the grinding media used in the milling operations be constructed of alumina, one of the metalline compounds, or of the metal to be used so that a foreign material is not introduced by attrition of the grinding media.

Molybdenum or tungsten which is preferred for use in the preparation of dispersions of this invention is characterized by:

(a) Having a specific surface area greater than 1 m.²/g.;
(b) Having an average particle size of less than 5μ and more preferably less than 1μ; and,
(c) Containing less than 1% by weight of oxygen and less than 1% by weight of carbon.

The wetting agents which can optionally be used in minor amounts in the dispersions of this invention such as titanium, zirconium, tantalum or hafnium, can be prepared in the same way as above described for the tungsten or molybdenum. Their hydrides can be prepared such as by ballmilling in an inter atmosphere corresponding commercially available fine metal hydrides.

The metal or metal hydride products obtained in this way are characterized by:

(a) Having an oxygen content lower than 1% by weight of the metal, and (b) Having a specific surface area higher than 1 m.$^2$/g.

Preparation of alpha alumina

The alpha alumina to be used in this invention can be prepared for example by extended milling and purification of an alpha alumina such as described in application Ser. No. 298,580 filed July 30, 1963.

Conventional methods can also be used to prepare alumina suitable for use in the compositions of this invention. Any alumina powder, regardless of crystalline form, can be used provided it will result in the refractory dispersions of this invention when prepared in accordance with the methods of this invention. According to this criteria for selection, such aluminas as submicron gamma alumina, colloidal boehmite, ultrafine amorphous alumina, and fine thermogenic eta alumina are all satisfactory.

A preferred alumina for use in this invention is one prepared according to the previously mentioned application Ser. No. 298,580. That process includes:

(a) Producing microcrystalline corundum having a crystallite size of less than 160 millimicrons diameter, as measured by broadening of the X-ray diffraction lines. This may be done either by grinding macrocrystalline corundum and isolating a colloidal fraction or by starting with an extremely finely divided amorphous alumina or transition alumina such as gamma, theta, delta, or eta, and then converting this at elevated temperature, in the presence of silica, to produce extremely small crystallites of corundum.

(b) Subjecting the microcrystalline corundum to attrition to produce discrete particles characterized by having a dry packing density of at least 2.0 grams per cubic centimeter.

(c) Separating the colloidal corundum from coarser material.

(d) Purification of the corundum by contacting it with a strong aqueous solution of hydrofluoric acid until the insoluble residue continues to lose less than 1% its weight per additional four hours of treatment, recovering the corundum from acid solution with exclusion of soluble aluminum salts, contacting the corundum with a weak base to replace adsorbed fluoride ions by hydroxyl groups, and separating the fluoride-free corundum from the solution of base by washing out the base.

Alpha alumina products obtained in this way are characterized by:

(a) Containing less than 1% by weight, based on the $Al_2O_3$, of metal oxides that are soluble in aqueous hydrofluoric acid, (b) Having a specific surface area greater than 10 square meters per gram, (c) Having a dry packing density under a pressure of 10 tons per square inch of at least 2.0 grams per cubic centimeter, and (d) Having a crystallite size determined by X-ray diffraction, of less than 150 millimicrons.

Preparation of the metalline components

The metalline components suitable for use in the dispersions of this invention are electrically conducting compounds selected from the group consisting of the borides of titanium, aluminum, zirconium, tantalum, hafnium, molybdenum, and tungsten or their mixtures. For use in the dispersions of this invention these metalline compounds should be pure and very finely divided. A suitable method of preparation is by extended ballmilling in an inert atmosphere of the commercially available compounds. Such commercial compounds can be obtained in a pure and finely divided state. Ballmilling times from 24 to 240 hours have been found satisfactory, the longer times being required when coarser starting materials are used.

To avoid the need for further purification, it is desirable that the grinding media used in the milling operation be constructed of a material which will not introduce an undesirable component into the dispersion. Alumina, carbide, boride, tungsten or molybdenum inserts can be used as grinding media. Inert fluids, such as hydrocarbon oils and acetone, and inert atmospheres such as nitrogen or argon can be used to prevent oxidation of the product.

The metalline products obtained in this way are characterized by:

(a) Having a specific surface area greater than 1 m.$^2$/g., (b) Having an average particle size of less than $10\mu$, and preferably less than $5\mu$, and (c) Containing less than 1.5% by weight of oxygen.

Another suitable method for the preparation of the metalline compounds of this invention is described in copending application Ser. No. 250,442 filed Jan. 9, 1963. That application is directed to disaggregated colloidal powders of certain particulate borides and carbides and to processes for their production. The compositions of that copending application are produced by processes in which the compound is formed by chemical reaction in a fused salt bath. The compositions of that copending application are obtained in the form of very small, discrete particles and do not grow into massive crystals during preparation.

The borides of titanium, zirconium, tantalum, hafnium, molybdenum and tungsten prepared by such a salt bath fusion are made up of ultimate particles 1 to 250 m$\mu$ in average dimension. These ultimate particles may, of course, be aggregated but the aggregates are loosely bound together and are easily redispersible.

Preparation of the powder dispersions

The interdispersions of the alumina with the metal, metalline compounds and wetting agent if desired, in the form of a powder, make up one of the preferred forms of this invention. The alumina can be interdispersed with the metal powder, the metalline compounds, and a wetting agent if used, in any convenient manner such as by mixing in a hydrocarbon oil or acetone in a colloid mill or a ballmill. Ballmilling times of from one hour, if the components have been previously milled for extended periods, to 240 hours, are satisfactory.

To eliminate the necessity of further purification of the dispersion it is desirable to employ grinding media, such as the balls, of pure alumina, molybdenum, or tungsten. This prevents foreign materials from being introduced into the composition as a result of the attrition of the grinding media. The mill can be a conventional steel mill or one which is coated with an elastomeric material such as neoprene, which is not softened or attacked by the grinding fluid. Milling conditions, such as the volume loading of the mill and the rate of rotation, can be optimized as hereinafter illustrated in the examples.

An alternate method of interdispersing the components with one another is to precipitate the molybdenum or tungsten on fine particles of alumina. The molybdenum or tungsten can be precipitated, for example, as a hydroxide or hydrous oxide and the resulting homogeneous mixture can then be reduced in hydrogen atmosphere at 900° C. with an intermediate step at 600° C. The metal wetting agents and the metalline compounds can then be incorporated by ballmilling in an inert atmosphere.

After mix milling the composition to homogeneity, the mixture can be transferred in an inert atmosphere to a suitable container and allowed to settle. The clear supernatant grinding fluid can be decanted and the remaining sludge dried in vacuum.

The average size of the particles can readily be determined by examination of the interdispersed powders using a light microscope for larger particles and an electron microscope for small particles. By average particle size is meant the number average of the particle diameters. In the preferred powdered dispersions the surface area per gram of solids is from about 5 to about 50 square meters. The surface area per gram can be determined by dividing the specific surface area as measured by standard nitrogen absorption techniques, by the weight of the solids in the dispersion.

Preparation of refractory dispersions

The interdispersions of the alumina with metal, metalline compounds and a wetting agent if used, in the form of a compact solid, make up another preferred form of this invention. A representative method for forming these refractory dispersions is by heating while pressing the powder dispersions to nearly theoretical density in vacuum or in inert atmosphere.

The pressing temperature will depend on the amount and state of subdivision of the components. In general, the temperatures will range between $7/10$ and $9/10$ of the melting point of the alumina and should be at least 1500° C. and not more than 1900° C. At the pressures used in this invention, temperatures lower than 1500° C. are not enough to produce densification of the compacts to the desired level. Temperatures higher than 1900° C. are unnecessary and tend to cause undesirable crystal growth of the components or melting of the compact.

The time the specimen spends at the temperature and pressure of fabrication will vary according to the pressing temperature, the composition, and the state of dispersion. In general, the pressing time will vary from a few seconds to 30 minutes.

A preferred pressing time is 1 to 3 minutes at goal temperature. This length of time is short and hence practical, and is enough to assure densification of the compact without danger of promoting undesirable crystal growth of the components. As an alternative method, the sample can be kept for 3 to 5 min. at goal temperature before pressure application. In this case, only 1 min. pressing time is necessary.

The pressure employed will also vary according to the temperature and method of fabrication used, and the composition and state of dispersion, but will generally range from about 500 pounds to over 6000 pounds per square inch.

Pressures lower than about 500 p.s.i. may not be enough to assure complete densification of the compacts. Pressures higher than 6000 p.s.i. are not practical with hot press equipment involving graphite dies, molds and plungers.

The combinations of pressing conditions, heating, and pressing cycle which can be used, will hereinafter be more completely illustrated in the examples.

Properties of refractory dispersions

The refractory interdispersions of this invention prepared in the form of a compact solid are dense and very strong, they have a microstructure of very fine grains, and are thermally stable and electrically conducting.

The grain size of the components in the refractory dispersion can be determined by preparing a metallographic section, etching with suitable chemicals well known to those in the art for etching alumina and tungsten or molybdenum, and examining the surface with a microscope. An optical microscope can be used for the examination of the structure and the details can be observed with an electron microscope. For electron micrographic examinations it is convenient to prepare first a conventional carbon or plastic replica of the surface on which measurements can be made.

The components of the refractory dispersion of this invention should have an average grain size less than $20\mu$. The average grain size of the more perferred embodiments of this invention will be less than $10\mu$ and the average grain size of the most preferred embodiments of this invention will be less than $1\mu$.

In one of the preferred embodiments of this invention, most of the alumina grains are separated from each other by a continuous metal matrix forming a homogeneous and uniform dispersion of alumina particles. The metalline component grains are embedded in the metal phase and are strongly bonded to the alumina particles.

In another preferred embodiment of this invention a refractory dispersion compact is made of discrete particles of alumina and the metalline compound which are uniformly dispersed in the metal which is present as a continuous phase of matrix separating the discrete alumina and metalline particles.

More specifically, it is preferred that the homogeneity of the dispersion be such that the distribution of the alumina, the metal and the metalline phase in the refractory dispersion is on a $100\mu$ scale. This means that a metallographic or an electron micrographic scan of the type conventionally used in metallurgy to examine the structure of alloys will show the alumina, metal and metalline phases to be present within any square region no greater than $100\mu$ on edge, and preferably no greater than $10\mu$ on edge.

Moreover, in the preferred embodiment of this invention any square region $10\mu$ on edge will exhibit substantially the same structural characteristics as every other such region in the dispersion within conventional statistical distribution limits.

A simple way of determining the presence of a continuous phase of metal or metalline components in refractory dispersions of this invention is by determining the electrical resistivity of the dispersion. If the alumina which is an electrical insulator is distributed so as to interrupt the continuity of the metal and metalline compound, the electrical resistivity of the refractory dispersion will be much higher than if the metal and metalline phase is continuous. Therefore when the metals and metalline compounds form a continuous phase throughout the refractory dispersion, the electrical resistivity, of the compact is inversely proportional to the volume fraction and thickness of the continuous metallic pathway. The electrical resistivity can then be a rough measure of the degree of continuity of the conductor components in the refractory dispersion. Refractory dispersions of this invention have an electrical resistivity less than 10,000 ohm cm. and the preferred compositions have an electrical resistivity less than 1000 ohm cm.

The refractory dispersions of this invention have a density in excess of 90% of the theoretical density and preferably in excess of 95% of the theoretical density. Those refractory dispersions which are to be put to such uses as cutting tools most preferably have a density in excess of 98% of the theoretical density and are substantially free from pores when examined by metallographic methods. The theoretical density is calculated by assuming that the specific volumes of the individual components are additive. The density of the compact solids made of the refractory dispersions of this invention can be determined by any technique for measuring the weight and volume of the composite. For example, the weight can be determined with a sensitive analytical balance and the volume can be determined by mercury or water displacement.

The strength of refractory dispersions of this invention, as measured by transverse rupture tests, ranges from 75,000 p.s.i. to more than 200,000 p.s.i.

Standard procedures can be used to measure the transverse rupture strength such as described in ASTM Standards, Part 5, pp. 432–433, 1961.

One method for measurement of transverse rupture strength of $0.07 \pm 0.005$ inch square bars at room temperature comprises supporting the sample bar on steel blocks adjustable to give spans of ½, ¾, and 1 inch. The steel blocks are in turn supported on the pan of a modified 20 kg. Ohaus triple beam balance. The cross head consists of a hardened steel knife, 0.04 inch thick and having a 0.02 inch radius of curvature at the point of contact with the sample. The knife is rigidly held in contact with the mid-point of the test bar by a saddle above the sample. The load is applied by running lead shot into a bucket suspended on the balance arm until the sample breaks.

The transverse rupture modulus in pounds per square inch is then calculated by the formula:

$$R = \frac{3We}{2bd^2}$$

where:

R = modulus of rupture,
W = total load in pounds at which the specimen fails,
e = distance between the supports in inches,
b = width of the specimen in inches, and
d = depth of specimen in inches.

A suitable procedure for measuring the impact strength of the refractory composites of this invention is ASTM Designation E23-60, ASTM Standards, Part 3, pp. 79–93, 1961. For this method a Tinius Olsen, Change-O-Matic Impact Testing Machine is used, the Izod vise being modified so that the hammer strikes the test bar ⅜ inch above the top of the vise. The test bars are 0.25±0.05 inch square cross section and at least one inch long, clamped rigidly so that ½ inch of the bar protrudes from the top of the vise. The sample bar is not notched, but otherwise the test procedure is as described in ASTM E23-60. The impact strength I is calculated from the following formula:

$$I = \frac{E}{12 \times b \times d}$$

where:

E = pendulum energy loss in inch-pounds,
b = width of specimen in inches, and
d = thickness of specimen in inches.

The refractory dispersions of this invention measured by the above procedure have an impact strength of from 10 to 50 foot-pounds per square inch.

Hardness measurements can be made on the refractory dispersions of this invention using a Wilson Model 3JR Rockwell Hardness Tester. The procedure described in ASTM Designation E18-61, ASTM Standards, part 3, pp. 39–52 is suitable. A diamond cone and a 60 kilogram load are used and the hardness is measured on the Rockwell A scale. By such a method the refractory dispersions of this invention have a hardness of between 70 and 93.

The improved properties of the refractory dispersions of this invention are probably due to contributing factors of composition, structure, density, uniformity, and metal distribution. The most preferred embodiment of this invention is a refractory dispersion in the form of a cutting tool or bit where all of the contributing factors above mentioned are simultaneously present.

Such a refractory composite is one in which alumina grains and grains of a metalline compound having an average size of less than a micron are uniformly dispersed in a continuous matrix of molybdenum or tungsten with a small amount of titanium as a wetting agent, so that the uniformity of distribution is on a scale of less than 100 square microns. The average size of the metal crystals in the composite is less than 1µ and continuity of the metal is such that the composite has an electrical resistivity of less than 0.001 ohm cm. The amount of alumina is about 1.49 parts by volume, the amount of metalline compound is about 0.19 part by volume, and the amount of titanium is about 0.03 part by volume, per part by volume of molybdenum or tungsten. The density of the compact is in excess of 99% of theoretical density.

The compact refractory dispersions of this invention are dense, strong, hard, fine grained, electrically and thermally conducting, thermally stable, and resistant to thermal shock. These properties make them particularly useful for structural applications, for erosion-resistant chemical equipment, for bearings, seals, thread guides and dies.

As stated above, the refractory dispersions of this invention are most particularly useful as tool bits in cutting, grinding, shaping, drilling and punching very hard metal or alloys at high speeds. This is due to their great impact strength and thermal conductivity and their unusual resistance to thermal shock, wear, cratering and welding.

In order that the invention can be better understood, the following illustrative examples are given wherein parts are by volume and percentages are by weight unless otherwise noted.

Example 1

Two hundred fifty grams of a pure commercial titanium boride powder having a surface area of 0.7 square meters per gram, an average particle size of about 3 microns, an oxygen content of 0.31%, and a carbon content of 0.5% are loaded in a nitrogen atmosphere into a neoprene-lined steel mill with 4500 grams of 94% tungsten carbide-6% cobalt inserts. The tungsten carbide-cobalt inserts are about ¼ inch in diameter and ¼ inch long and in the form of small cylinders. Also loaded into the mill are 250 milliliters of a high boiling hydrocarbon oil having a flash point of 185° F. The mill is rotated on rubber-lined rollers for a period of one week at 90 revolutions per minute.

The resulting finely divided material is recovered from the mill and separated from the tungsten carbide-cobalt rod inserts, and is removed from the majority of the oil by decantation. All of these operations are carried out in a nitrogen atmosphere. The dispersion is then dried in a vacuum oven with nitrogen purge at 125° C. for four hours.

This ballmilled titanium boride powder has a surface area of 3.6 square meters per gram, an average particle size of around 0.5 micron, an oxygen content of 0.93% and a carbon content of 2.9%.

Five grams of this ballmilled titanium boride are loaded into a ¼ gallon steel mill with 34 grams of colloidal corundum powder having a surface area of 30 square meters per gram, and an average particle size of 50 millimicrons. Also loaded into the mill are 1 gram of titanium hydride and 60 grams of finely divided molybdenum metal having a particle size of about 300 millimicrons, a surface area of 2 square meters per gram, and an oxygen content of 0.18%.

Two hundred fifty milliliters of a high boiling hydrocarbon oil having a flash point of 185° F. and 3000 grams of molybdenum metal rod inserts are also loaded into the mill. The molybdenum metal inserts are in the form of small cylinders about ¼ inch in diameter and ¼ inch long. The mill is loaded and closed in a nitrogen atmosphere to prevent oxidation of the material during the milling operation. The mill is rotated on rubber-lined rollers for a period of 3 hours at 90 revolutions per minute.

The resulting finely divided powder dispersion of alumina, metals and metalline compound is recovered from the mill, separated from the molybdenum inserts, and removed from most of the oil by decantation. All of these operations are carried out in a nitrogen atmosphere. The dispersion is then dried at about 125° C. in vacuum.

The molybdenum inserts lose less than 3 grams in the 3 hour milling operation.

Chemical analysis of the powder dispersion shows that it contains about 34% $Al_2O_3$, 60% Mo, 5% $TiB_2$, 1% $TiH_4$ and 0.7% carbon. Surface area is 12 square meters per gram.

Twenty grams of this powder are placed in a cylindrical carbon mold, in an inert atmosphere. The temperature is raised to 1600° C. under vacuum and after 5 minutes a pressure of 4000 pounds per square inch is imposed. Temperature and pressure are held for 1 minute. Pressure is then removed, the sample is allowed to cool and is then removed from the furnace.

The resulting refractory compact of this invention is cut with a diamond saw into specimens for testing transverse rupture strength, impact strength, hardness on the Rockwell A scale, and density. A section is machined in the form of a metal cutting tool insert. The transverse rupture strength is 145,000 p.s.i., its impact strength 16, and its Rockwell A hardness 89. The density is 6.32 grams per cubic centimeter, which is 99% of the theoretical density to be expected for these compositions, based on the density of the original components.

Metallographic examination of the compact shows that the alumina, the molybdenum and the titanium boride are present within a square region 10 microns on edge, and of ten such 100 sq. micron regions examined, all exhibit these same structural characteristics. The compact contains 1.43 parts of alumina, 0.19 part of titanium boride and 0.037 part of titanium per part of molybdenum.

The electrical resistivity of the dispersion is $89 \times 10^{-6}$ ohm cm. This high conductivity indicates that the metal and metalline components form a continuous phase.

A cutting tool insert of this composition is tested on 4340 steel, using a depth of cut of ⅛ inch, a surface speed of 400 surface feet per minute, and varying the feed rate. At a feed rate of 0.020 inch per revolution, after 1 minute of cutting the flank wear is 4 mils and the depth of the crater formed is ½ mil. At a feed rate of 0.030 inch per revolution, after 1 minute of cutting the flank wear is 5 mils and the crater depth is 2 mils.

The cutting tool insert of this invention can cut 4340 steel even at a speed of 1500 feet per minute, using a depth of cut of 0.050 inch and a feed rate of 0.010 inch per revolution. In this case the flank wear is 23 mils in 3 minutes, and the crater depth is 4 mils.

Example 2

A thoria-modified molybdenum is prepared by suspending 97 g. of the molybdenum metal powder used in Example 1 in water at a pH of 3.5 adjusted with dilute hydrochloric acid, stirring with a magnetic bar for one minute and adding immediately 17.6 g. of a thoria sol containing 3 g. of thoria. This thoria sol is made up of substantially discrete particles with a specific surface area of 61 m.²/g. and an average particle size of about 10 m$\mu$. After stirring for 1 additional minute the mixed suspension of molybdenum and thoria is dried in vacuum at 100° C. while stirring with a magnetic bar. The powder obtained is collected in an inert atmosphere.

The same amount of alumina, titanium hydride and titanium boride of Example 1 are milled with 60 g. of the above thoria modified molybdenum metal, as described in the previous example. Recovery from the mill, purification, drying and hot pressing are also as described in the previous example.

The resultant refractory contains 1.43 parts of alumina, 0.19 part of titanium boride, and 0.037 part of titanium per part of molybdenum.

The density of the composition is 6.33 g./cc., which is the theoretical density to be expected of it. As in the previous example, this refractory is an excellent cutting tool for steel.

Example 3

Thirty-five grams of the alumina powder of Example 1, 5 g. of the titanium boride of Example 1, and 60 g. of the molybdenum powder of the same example are placed in a ballmill, along with the same amount of molybdenum inserts and hydrocarbon oil as described in Example 1.

Milling is done in the same way as described in Example 1, and so is the recovery of the final product. There is no weight loss of the molybdenum inserts during the milling operation.

Fifteen grams of this powder are loaded into a graphite mold and heated to 1700° C. After 5 minutes at this temperature, 4000 p.s.i. of pressure are applied and held for 1 minute. The pressure is then released, the sample allowed to cool and then removed from the furnace.

The resulting refractory dispersion of this invention has a transverse rupture strength of 130,000, an impact strength of 25 ft. lbs./in.² and a Rockwell A hardness of 88.3. It also has a density of 6.27 g./cc. or 100% of the theoretical density to be expected for this composition. It is composed of 1.47 parts of alumina and 0.19 part of titanium boride per part of molybdenum.

Example 4

Seventy-eight and six-tenths grams of the alumina powder of Example 1, 0.5 g. of the titanium boride powder of Example 1, and 20.9 g. of molybdenum powder of Example 1 are placed in a ballmill along with the same amount of molybdenum inserts and hydrocarbon oil as described in Example 1.

The material is milled in the same way, and the recovery of the final product is accomplished as in Example 1. Analysis shows the product to contain 90% by volume alumina, 0.5% by volume titanium boride, and 9.5% by volume molybdenum.

Twenty grams of the dry powder are placed in a carbon cylinder and pressed in the equipment described in Example 1. The temperature is raised at 1000° C. under vacuum and 4000 p.s.i. of pressure is then imposed. The temperature is then raised to 1500° C. and the temperature and pressure are held for 30 minutes.

The resulting refractory dispersion has a transverse rupture strength of 100,000 p.s.i., an impact strength of 13 ft. lbs./in.², and a Rockwell A hardness of 90. This dispersion contains 10 parts of alumina and 0.05 part of titanium boride per part of molybdenum.

Example 5

Thirty-seven grams of the alumina powder of Example 1, 11.3 g. of zirconium boride, and 51.7 g. of molybdenum powder of Example 1 are loaded in a ballmill along with the same amount of molybdenum inserts and hydrocarbon oil as described in Example 1. The zirconium diboride is finely divided, having an average particle size of about one micron.

The material is ballmilled in the same way, and the recovery of the final product is accomplished as in Example 1. The molybdenum inserts show no weight loss in this milling operation.

Fifteen grams of this powder are loaded into a graphite mold and pressed in the equipment described in Example 1, also using the same pressing conditions. The refractory dispersion thus obtained is dense, strong and hard.

Example 6

A composition is made by coprecipitating alumina and molybdenum in a reactor in the manner taught in U.S. Patent No. 2,949,358 and mixing the product with titanium boride and titanium hydride. The reactor consists of a stainless steel cylinder with a conical bottom, fitted with connections whereby fluid can be pumped from the bottom of the reactor through a pipeline and back to the reactor. Feed solutions are introduced into the system through separate T-tubes in the external line.

The feed solutions consist of:
(a) Twenty-one and seventy-seven hundredths g. of a colloidal thoria solution containing 3.7 g. of $ThO_2$, and 8.5 liters of ammonium molybdate,

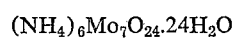

$$(NH_4)_6Mo_7O_{24} \cdot 24H_2O$$

in aqueous solution, prepared by dissolving 177 g. of molybdate in $H_2O$, adjusting the pH to 3.5 with concentrate HCl, and adding 63.75 g. of $N_2H_4 \cdot H_2O$ in order to reduce the Mo to a +5 valence state;

(b) 8.5 liters of aqueous $NH_4OH$ containing 840 cc. of concentrated $NH_4OH$; and (c) 453 g. of a 15% by weight colloidal corundum sol, with substantially non-aggregated alumin particles of 50 mμ average particle size, diluted with 1500 cc. of $H_2O$.

These feed solutions are introduced, simultaneously but separately, into the reactor which contains 1 liter of $H_2O$. They are introduced at a rate of 400 ml./min. for each solution. The pH of the final slurry is 8.

The precipitate of molybdenum hydroxide on the alumina particles is recovered by filtration and washing. The product is dried at 240° C. This product is reduced at 500° C. in a slow stream of hydrogen for a period of 5 hrs. The reduction is then continued for 16 hours at 750° C. The product is a finely divided powder consisting of alumina and molybdenum metal with a small amount of thoria.

This powder is placed in a ballmill with 10 g. of titanium boride powder of Example 1, and 2 g. of titanium hydride, along with the same amount of molybdenum inserts and hydrocarbon oil as described in Example 1.

The material is ballmilled in the same way as Example 1 and the final product is recovered in the same manner as in Example 1.

The molybdenum inserts show no weight loss in this milling operation. The product contains 0.75% of oxygen and 0.6% of carbon.

Seventeen grams of this powder are loaded into a graphite mold and pressed in the equipment described in Example 1, also using the same pressing conditions.

The resulting refractory dispersion of this invention has a transverse rupture strength of 100,000 p.s.i., an impact strength of 10 ft. lbs./in.² and a Rockwell A hardness of 92. It contains 1.43 parts of alumina, 0.19 part of titanium boride, and 0.037 part of titania per part of molybdenum.

Example 7

Thirty-five grams of the alumina powder, 5 g. of the titanium boride, and 55 g. of the molybdenum powder of Example 1 are placed in a ballmill, along with the same amount of molybdenum inserts and hydrocarbon oil as described in Example 1. Five grams of zirconium powder are also added. This zirconium powder has an average particle size of about 4μ.

Milling is carried out as described in Example 1, and so is the recovery of the final product. The molybdenum inserts do not lose any weight during this milling operation.

Fifteen grams of this powder are pressure sintered following the procedure described in Example 1.

The refractory compact obtained is substantially dense, very strong, has excellent impact strength and is very hard. It contains 1.73 parts of alumina, 0.11 part of titanium boride and 0.151 part of zirconium per part by volume of molybdenum.

Example 8

The composition of Example 1 is prepared, substituting 1 g. of tantalum metal powder for the 1 g. of titanium hydride. The tantalum metal powder is finely divided, having a surface area of 0.13 m.²/g., an average particle size of about 3μ, and an $O_2$ content of 0.11%.

The compacted refractory dispersions obtained with this composition are dense, strong and hard. They contain 1.60 parts of alumina, 0.20 part of titanium boride, and 0.011 part of zirconium per part of molybdenum.

Example 9

The composition of Example 12 is prepared, substituting 1 g. of hafnium metal powder for the 1 g. of tantalum metal powder. The hafnium metal powder is finely divided, having an average particle size of about 5μ.

The powder mixture is loaded into graphite dies and pressed at 1800° C. and 1000 p.s.i. for 5 minutes.

The refractory dispersion thus prepared is dense, strong and hard. It consists of 1.60 parts of alumina, 0.20 part of titanium boride, and 0.011 part of hafnium per part of molybdenum.

Example 10

Two thousand g. of a 325 mesh alpha tabular alumina, commercially available as grade T–61 alumina powder is loaded into a steel mill half filled with steel balls. 2000 g. of $H_2O$ are added and the mill is rotated at 35 r.p.m. for 144 hours. After the milling operation, the alumina is recovered, treated with a mixture of hydrochloric and nitric acid to remove the iron, washed with $H_2O$, and dried.

The milled alumina powder has a surface area of about 9 m.²/g. and an average particle size of around 2 microns.

Thirty-four grams of this alumina powder, and 5 g. of the titanium boride, 1 g. of the titanium hydride and 60 g. of the molybdenum metal powder of Example 1 are placed in a ballmill along with the same amount of molybdenum inserts and hydrocarbon oil as described in Example 1. Milling is done in the same way described in Example 1 and so is the recovery of the final product.

Twenty grams of the product are placed in a cylindrical carbon mold in an inert atmosphere. The temperature is raised at 1000° C. under vacuum and 4000 p.s.i. of pressure is then imposed. The temperature is raised to 1880° C. and temperature and pressure are held for one minute. Pressure is then removed, the sample is allowed to cool and is then removed from the furnace.

The refractory compact obtained is substantially dense, very strong and has excellent impact strength. This refractory compact is an excellent cutting tool for steel. It contains 1.43 parts of alumina, 0.19 part of titanium boride and 0.037 part of titanium per part of molybdenum.

I claim:
1. A composition consisting essentially of 1 part by volume of a metal selected from the group consisting of molybdenum, tungsten, and their alloys, in which metal is homogeneously dispersed:
 (1) from 0.05 part to 4 parts by volume of a metalline compound selected from the group consisting of the borides of titanium, aluminum, tantalum, zirconium, tungsten, molybdenum, hafnium, and their mixtures, and
 (2) from 1 to 9 parts by volume of alumina, with the limitation that said metalline compound shall not be present in a volume greater than the volume of alumina.
2. The composition of claim 1 wherein:
 (A) the parts by volume of alumina varies from 1 to 6, and
 (B) said metal, metalline compound, and alumina have an average particle size of less than 10 microns.
3. The composition of claim 2 wherein:
 (A) said metal is powdered, and
 (B) said metal, metalline compound, and alumina have an average particle size of less than 1 micron.
4. The composition of claim 3 wherein said metalline compound is titanium diboride.
5. The composition of claim 1 having:
 (A) a density in excess of 95% of its theoretical density, and
 (B) an average grain size of its components of less than 10 microns.
6. A composition consisting essentially of 1 part by volume of a metal in the form of a continuous matrix selected from the group consisting of molybdenum, tungsten, and their alloys, in which is homogeneously dispersed:
 (1) from 0.05 part to 4 parts by volume of a metalline compound selected from the group consisting of the borides of titanium, aluminum, tantalum, zirconium, tungsten, molybdenum, hafnium, and their mixtures, and

(2) from 1 part to 6 parts by volume of alumina, with the limitations:
- (I) that said metalline compound shall not be present in a volume greater than the volume of alumina,
- (II) that said composition has a density in excess of 98% of its theoretical density, and
- (III) that said composition have an average grain size of its components of less than 1 micron.

7. The composition of claim 6 wherein said metalline compound is titanium diboride.

8. A composition consisting essentially of 1 part by volume of a metal selected from the group consisting of molybdenum, tungsten, and their alloys, in which is homogeneously dispersed:
- (1) from 0.05 part to 1 part of a metalline compound selected from the group consisting of the borides of titanium, aluminum, tantalum, zirconium, tungsten, molybdenum, hafnium, and their mixtures, and
- (2) from 1 to 9 parts by volume of alumina, with the limitation that said metalline compound shall not be present in a volume greater than the volume of alumina, and
- (3) from 0 part to 0.1 part by volume of a wetting agent selected from the group consisting of (i) titanium, (ii) zirconium, (iii) hafnium, (iv) tantalum, and (v) the hydrides of (i)-(iv), with the limitations:
  - (I) that said metalline compound shall not be present in a volume greater than the volume of alumina;
  - (II) that said composition has a density in excess of 98% of its theoretical; and
  - (III) that said composition have an average grain size of its components of less than 1 micron.

9. The composition of claim 8 wherein the parts by volume of wetting agent varies from 0.005 to 0.05.

10. The composition of claim 8 wherein said wetting agent is selected from the group consisting of (a) titanium hydride, (b) hafnium, and (c) tantalum.

11. The composition of claim 10 wherein said wetting agent is titanium hydride.

References Cited

UNITED STATES PATENTS

| | | | |
|---|---|---|---|
| 3,037,857 | 6/1962 | Conant | 75—202 X |
| 3,147,543 | 9/1964 | Doerner | 75—202 X |
| 3,409,416 | 11/1968 | Yates | 29—182.5 |

BENJAMIN R. PADGETT, Primary Examiner

ARTHUR J. STEINER, Assistant Examiner

U.S. Cl. X.R.

75—.5, 202, 206; 106—62